(12) United States Patent
Zhou

(10) Patent No.: US 12,157,629 B2
(45) Date of Patent: Dec. 3, 2024

(54) GOODS-TRANSPORT VEHICLE

(71) Applicant: Pengyue Zhou, Guangdong (CN)

(72) Inventor: Pengyue Zhou, Guangdong (CN)

( * ) Notice: Subject to any disclaimer, the term of this patent is extended or adjusted under 35 U.S.C. 154(b) by 264 days.

(21) Appl. No.: 17/687,739

(22) Filed: Mar. 7, 2022

(65) Prior Publication Data

US 2022/0204260 A1 Jun. 30, 2022

Related U.S. Application Data

(63) Continuation of application No. PCT/CN2020/000211, filed on Sep. 4, 2020.

(30) Foreign Application Priority Data

Sep. 6, 2019 (CN) .......................... 201921489207.4

(51) Int. Cl.
*B65G 1/04* (2006.01)
*B60P 7/06* (2006.01)
*B62D 33/04* (2006.01)

(52) U.S. Cl.
CPC .................. *B65G 1/04* (2013.01); *B60P 7/06* (2013.01); *B62D 33/042* (2013.01)

(58) Field of Classification Search
CPC .. B60P 7/06; B60P 7/10; B60P 7/0892; B60P 7/13; B60P 3/07; B65G 1/02; B65G 1/04; B65G 1/0407; B65G 1/0428; B65G 1/08; B65G 2201/025

USPC ................ 414/458, 298, 292, 539, 276, 351
See application file for complete search history.

(56) References Cited

U.S. PATENT DOCUMENTS

| | | | | |
|---|---|---|---|---|
| 3,674,159 A | * | 7/1972 | Lemelson | B65G 1/0407 414/283 |
| 3,951,276 A | * | 4/1976 | Moses | B65G 1/08 414/607 |
| 2019/0143872 A1 | * | 5/2019 | Gil | B60P 1/54 211/86.01 |
| 2020/0122626 A1 | * | 4/2020 | Westfall | G06Q 10/083 |

\* cited by examiner

*Primary Examiner* — Glenn F Myers

(57) ABSTRACT

A goods-transport vehicle comprises a vehicle body (2) and a goods rack (3) arranged in the vehicle body (2), the goods rack (3) is provided with a plurality of storage spaces (34) used for storing goods (1). The goods-transport vehicle further comprises a fixing mechanism (4) and a picking mechanism (5). The fixing mechanism (4) is arranged in each storage space (34). After the goods (1) are placed in the corresponding storage space (34), the fixing mechanism (4) is used to automatically fix the goods (1) relative to the storage space (34). The picking mechanism (5) is arranged in the vehicle body (2), and is used to automatically place the goods (1) in each storage space (34) and to automatically take the goods from each storage space (34).

20 Claims, 12 Drawing Sheets

FIG. 13

GOODS-TRANSPORT VEHICLE

CROSS REFERENCE TO RELATED APPLICATIONS

The present disclosure is a continuation application of the international application No. PCT/CN2020/000211 filed on Sep. 4, 2020, which claims priority from the Chinese patent application No. 201921489207.4, entitled "goods-transport vehicle", filed on Sep. 6, 2019, the entire content of which are hereby incorporated by reference.

TECHNICAL FIELD

The present disclosure belongs to the technical field of transport equipment, and particularly relates to a goods-transport vehicle.

BACKGROUND

As for land transportation of express delivery goods, the goods are usually loaded and stacked as a whole in a vehicle body of the goods-transport vehicle. If the goods-transport vehicle needs to automatically deposit the goods into the vehicle body from several different places and to automatically take the designated goods out from the vehicle body at several different places, the goods-transport vehicle may be provided with an internal automatic picking mechanism similar to that applied in the warehouse automatic storage system, that is, a goods rack with a plurality of storage spaces is arranged in the vehicle body of the goods-transport vehicle, and the vehicle body is also provided with an access opening. The automatic picking mechanism can automatically move the goods between each storage space and the access opening, so as to realize that the goods-transport vehicle automatically deposits/retrieves the goods in the vehicle body.

However, compared with the warehouse automatic storage system, the goods-transport vehicle is prone to cause shaking of the goods when being running, which may inflict damage on the goods. Besides, when the goods-transport vehicle is running, once the goods move relative to the storage space in which the goods are positioned, it is difficult for the automatic picking mechanism to accurately take the goods.

SUMMARY

As such, the present disclosure proposes a goods-transport vehicle, the goods-transport vehicle comprises a vehicle body, a goods rack arranged in the vehicle body, and a picking mechanism arranged in the vehicle body. Wherein, the goods rack is provided with a plurality of storage spaces used for storing goods, the picking mechanism is used to automatically place the goods in each storage space and to automatically take the goods from each storage space. The goods-transport vehicle further comprises a fixing mechanism arranged in each storage space. Wherein, after the goods are placed in the corresponding storage space by the picking mechanism, the fixing mechanism is used to automatically fix the goods relative to the storage space.

Details of one or more embodiments of the invention are provided in the following drawings and description. Other features, objects and advantages of the invention will become obvious from the description, the drawings and the claims.

BRIEF DESCRIPTION OF DRAWINGS

To better explain the embodiments of the present disclosure or the technical solutions of the prior art, the following will briefly introduce the drawings involved in the description of the embodiments or the prior art. It is obvious that the drawings in the following description are only some embodiments of the invention. For persons skilled in the art, the drawings of other embodiments can be obtained from these drawings without paying creative work.

FIG. 13 is a structural diagram of the goods according to one embodiment;

FIG. 17 is an enlarged side view of the part B in FIG. 14 when the clamping arm makes the fixing mechanism release the goods according to.

DETAILED DESCRIPTION OF THE EMBODIMENTS

In order to help understanding of the present disclosure, the present disclosure will be described more comprehensively hereinafter with reference to the relevant accompanying drawings.

For convenience of description, three coordinate axes perpendicular to one another in space are respectively defined as an X axis, a Y axis and a Z axis. Wherein the X axis and the Y axis are two coordinate axes perpendicular to each other in the same horizontal plane, the Z axis is the coordinate axis in the vertical direction. Three planes perpendicular to one another in the space where the X axis, the Y axis and the Z axis are positioned are respectively defined as an XY plane, a YZ plane and a XZ plane. Wherein the XY plane is a horizontal plane, the XZ plane and the YZ plane are vertical planes, the XZ plane is perpendicular to the YZ plane.

Figure 1:
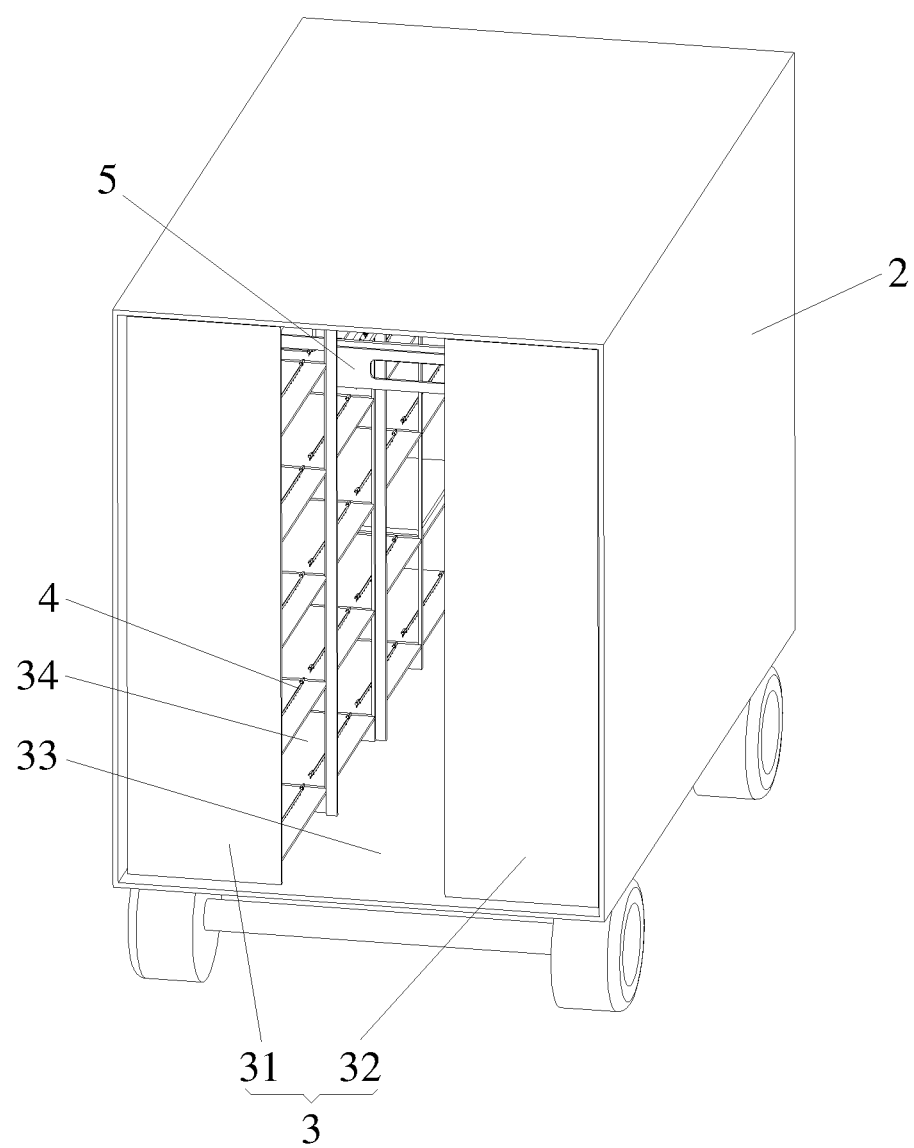
FIG. 1 is the first diagram of partial structure of a goods-transport vehicle according to one embodiment of the present disclosure.
Figure 2:
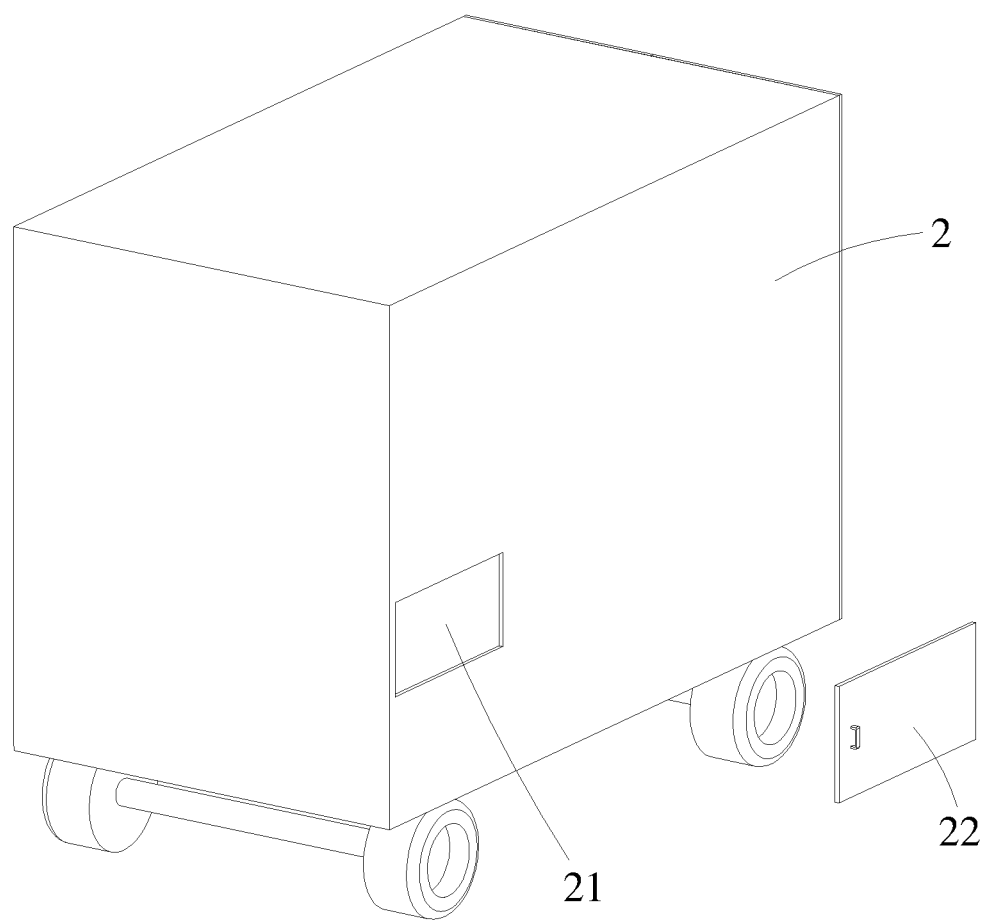
FIG. 2 is the second diagram of partial structure of the goods-transport vehicle according to one embodiment of the present disclosure.
Figure 3:
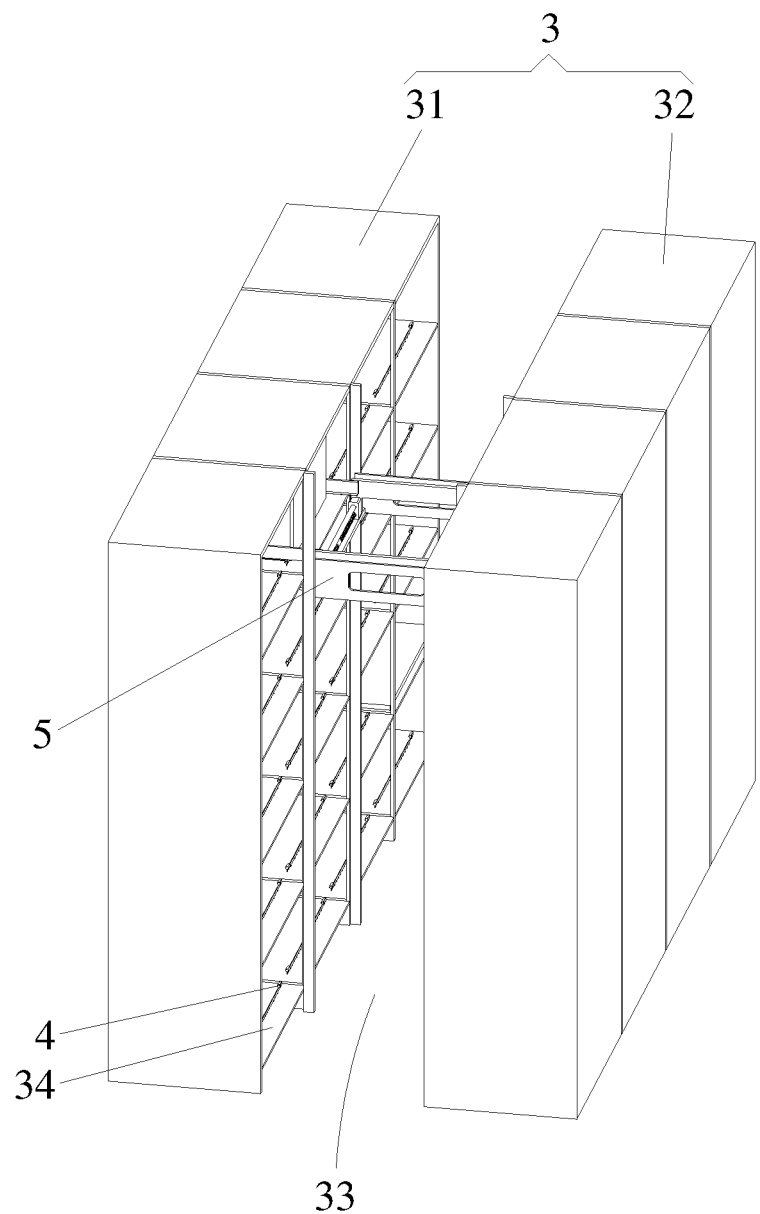
FIG. 3 is a structural diagram of a goods rack, a picking mechanism and fixing mechanisms according to one embodiment of the present disclosure.

Referring to FIGS. 1-3, the goods-transport vehicle according to one embodiment comprises a vehicle body 2 and a goods rack 3 arranged in the vehicle body 2. The goods rack 3 is provided with a plurality of storage spaces 34 used for storing goods 1. Specifically, the outline of each of the goods 1 is a square body or at least the bottom outline of each of the goods 1 is a square body. The goods-transport vehicle further comprises a fixing mechanism 4 arranged in each storage space 34 and a picking mechanism 5 arranged in the vehicle body 2. The picking mechanism 5 is used to automatically place the goods 1 in each storage space 34, and is used to automatically take the goods 1 from each storage space 34. After the goods 1 are placed in the corresponding storage space 34 by the picking mechanism 5, the fixing mechanism 4 is used to automatically fix the goods 1 relative to the storage space 34. Specifically, each storage space 34 is provided with a storage plate 341 on which the goods 1 may be placed on.

In one embodiment, please refer to FIG. 3. The goods rack 3 may comprises a first rack body 31 and a second rack body 32. The first rack body 31 and the second rack body 32 are oppositely arranged, and are each provided with the plurality of storage spaces 34. Between the first rack body 31 and the second rack body 32, an aisle 33 for the movement of the picking mechanism 5 is formed, and the aisle 33 is communicated with each storage space 34. According to this structure, the picking mechanism 5 is capable of respectively depositing the goods 1 into the storage spaces 34 of the first rack body 31 and the second rack body 32, or retrieving the goods 1 from the storage spaces 34 of the first rack body 31 and the second rack body 32. In other embodiments, the number and the position of the rack body may be adjusted as needed, which is not limited herein.

In one embodiment, referring to FIG. 2, the exterior sidewall of the vehicle body 2 is provided with an access opening 21 and a shielding panel 22 used for shielding the access opening 21. One storage space 34 of the first rack body 31 or of the second rack body 32 is communicated with the access opening 21. After an operator or an external equipment sends the goods 1 via the access opening 21 into the storage space 34 which is communicated with the access opening 21, the picking mechanism 5 is capable of moving the goods 1 to the other designated storage spaces 34. After the goods 1 are placed in the storage space 34, the fixing mechanism 4 automatically fixes the goods 1 relative to the storage space 34, thus the automatic operation of depositing the goods 1 into the designated storage space 34 being in the vehicle body 2 and fixing the goods 1 relative to the storage space 34 is completed. Reversely, the fixing mechanism 4 automatically releases the goods 1, the picking mechanism 5 moves the goods 1 from the storage space 34 in which the goods were positioned to the storage space 34 which is communicated with the access opening 21, then the operator or the external equipment takes the goods 1 away via the access opening 21, thus the automatic operation of taking the goods 1 out of the designated storage space 34 being in the vehicle body 2 is completed. In other embodiments, the number, the position and the size of the access opening 21 may be adjusted as needed, which is not limited herein; also, a mechanism used for moving the goods may be arranged at the access opening 21 of the vehicle body 2 in order to realize that the goods 1 are automatically moved into/out of the vehicle body 2 via the access opening 21.

Compared with the prior art, the goods-transport vehicle provided by the present disclosure owns the following advantages.

The fixing mechanism 4 is arranged in each storage space 34 of the goods rack 3: after the goods 1 are placed in the designated storage space 34 by the picking mechanism 5, the fixing mechanism 4 can automatically fix the goods 1 relative to the storage space 34 so as to make the goods 1 avoid shaking relative to the storage space 34 when the goods-transport vehicle is running, thereby protecting the goods 1 from collision and from being damaged, also, the goods 1 are remained at the designated position of the storage space 34 so as to ensure that the picking mechanism 5 can accurately take the goods 1.

In one embodiment, the fixing mechanism 4 may be driven by a controlled electromagnetic assembly or a controlled pneumatic assembly to automatically fix and to automatically release the goods 1. In other embodiments, the fixing mechanism 4 may be driven by other type of actuator to automatically fix and to automatically release the goods, which is not limited herein.

Figure 4:
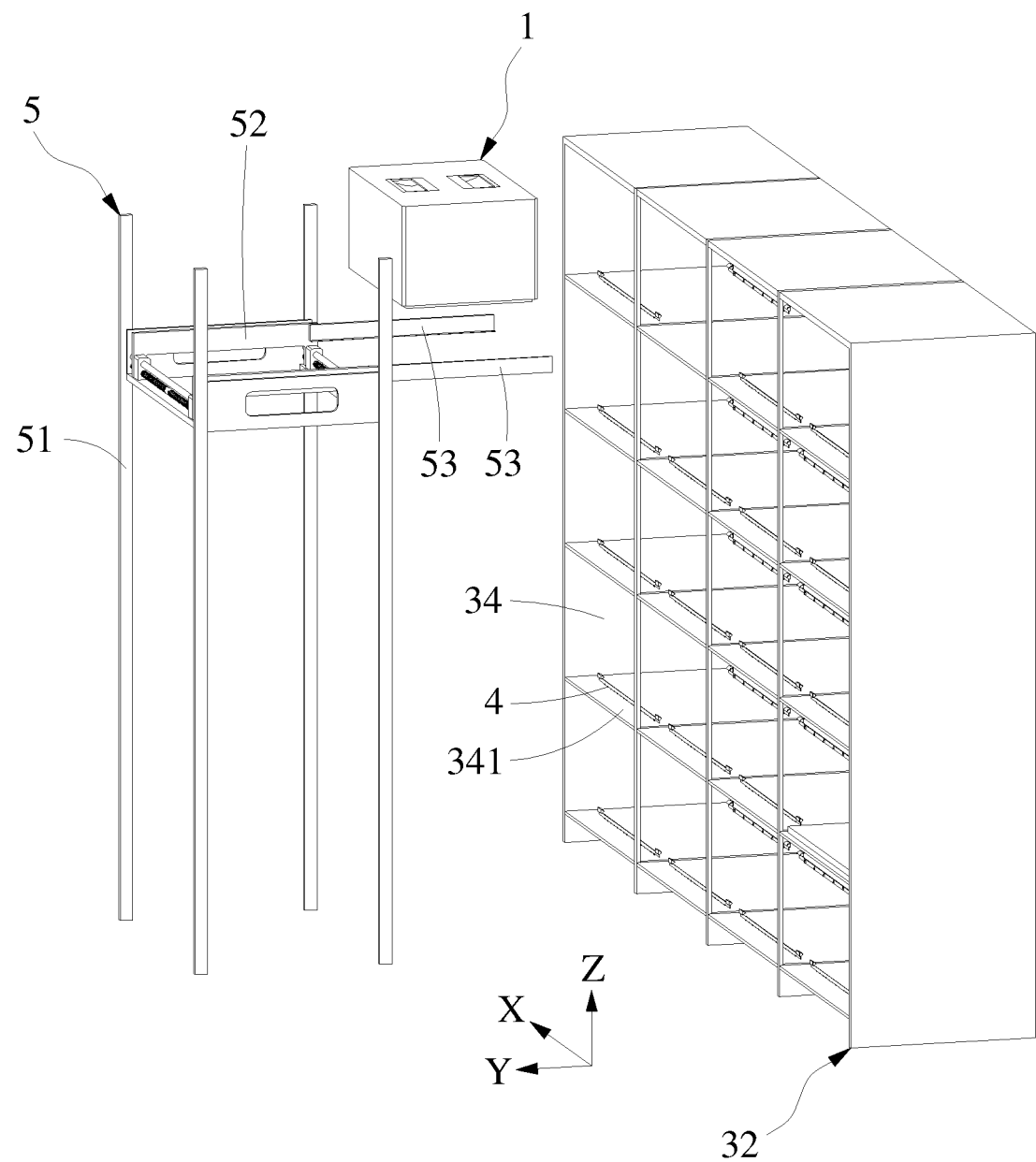
FIG. 4 is the structural diagram of the picking mechanism, goods, the fixing mechanisms and the second rack body according to one embodiment of the present disclosure.
Figure 5:
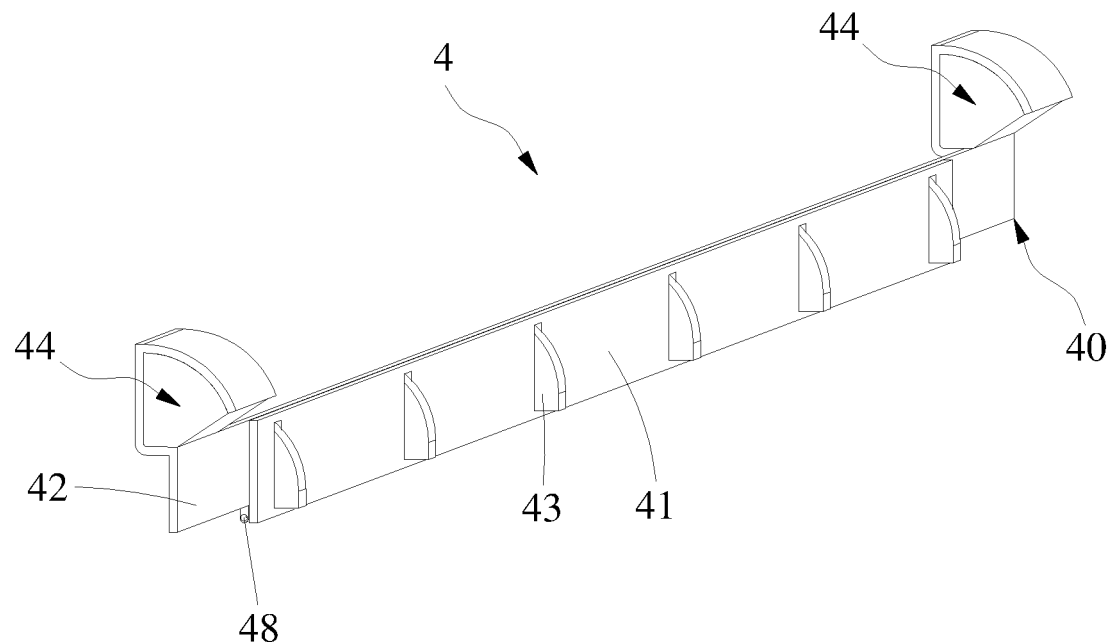
FIG. 5 is a structural diagram of the fixing mechanism according to one embodiment of the present disclosure.

In another embodiment, please refer to FIG. 4 and FIG. 5. The fixing mechanism 4 comprises at least one action assembly 40 arranged in each storage space 34 and a self-restoring member arranged on the action assembly 40. The action assembly 40 is used to be driven by an acting force of the picking mechanism 5 so as to release the goods 1 in process of the picking mechanism 5 taking the goods 1 from the corresponding storage space 34. The self-restoring member is used to drive the action assembly 40 to fix the goods 1 when the action assembly 40 is not subjected to the acting force of the picking mechanism 5. It can be understood that when the acting force of the picking mechanism 5 to which the action assembly 40 is subjected decreases gradually, the self-restoring member can also drive the action assembly 40 to fix the goods 1. In this embodiment, as the fixing mechanism 4 automatically releases the goods 1 by means of the acting force of the picking mechanism 5, and automatically fixes the goods 1 by means of the self-restoring member, so that the actuator is not required to be additionally arranged in each storage space 34, thus, an issue that the fixing mechanism 4 driven by one of the actuators cannot work properly due to failure of that actuator is avoided, the overall reliability of the goods-transport vehicle is improved, also, the production cost and the maintenance cost of the goods-transport is significantly lowered. Besides, in process of the goods 1 being taken/placed, the fixing mechanism 4 can release/fix the goods 1 in sync with the operation of the picking mechanism 5 taking/placing the goods 1, thereby avoiding lowing the efficiency of the picking mechanism 5 taking/placing the goods 1.

Figure 11:
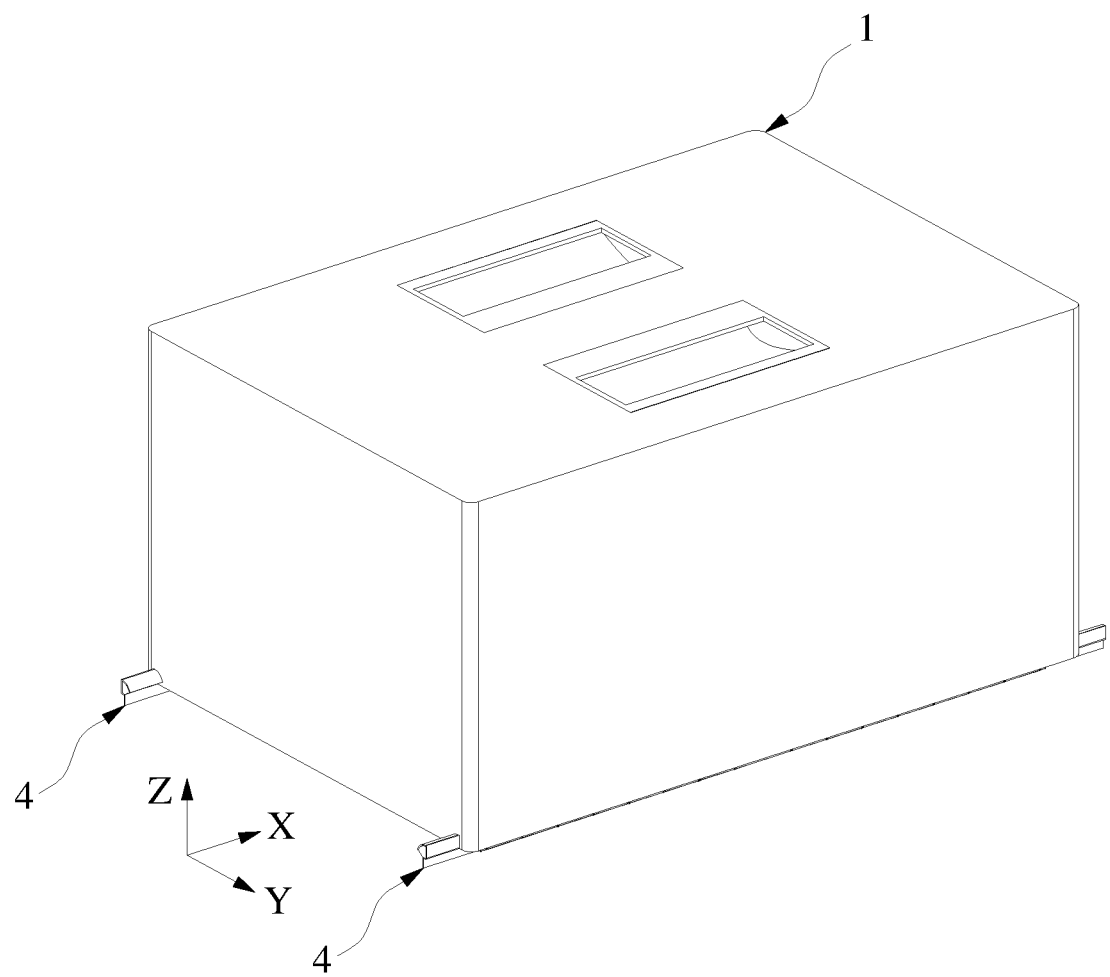
FIG. 11 is a structural diagram of two action assemblies when those two action assemblies fix the goods according to one embodiment of the present disclosure.
Figure 12:
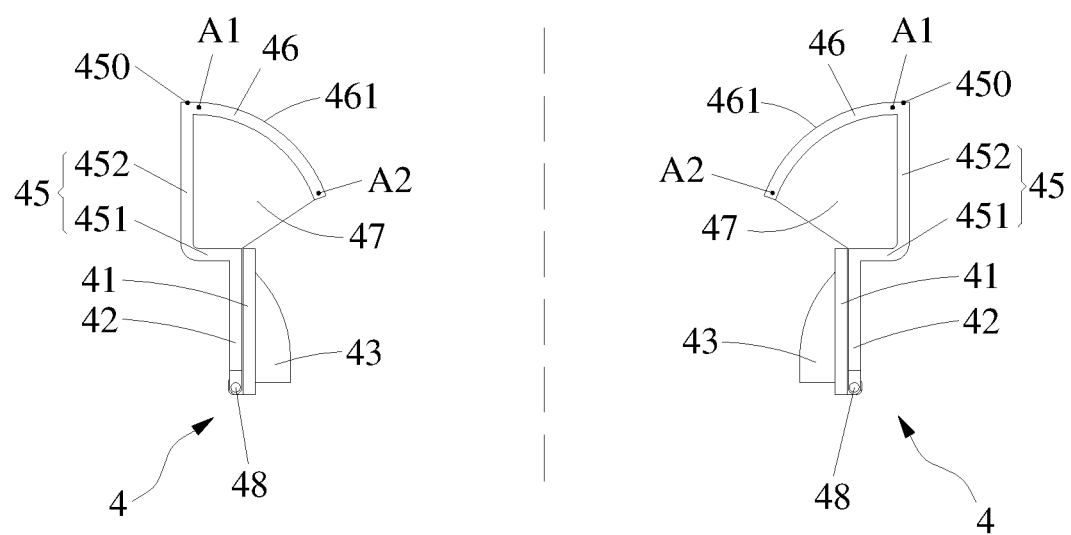
FIG. 12 is a side view of the two action assemblies being fixing the same goods according to one embodiment of the present disclosure.
Figure 14:
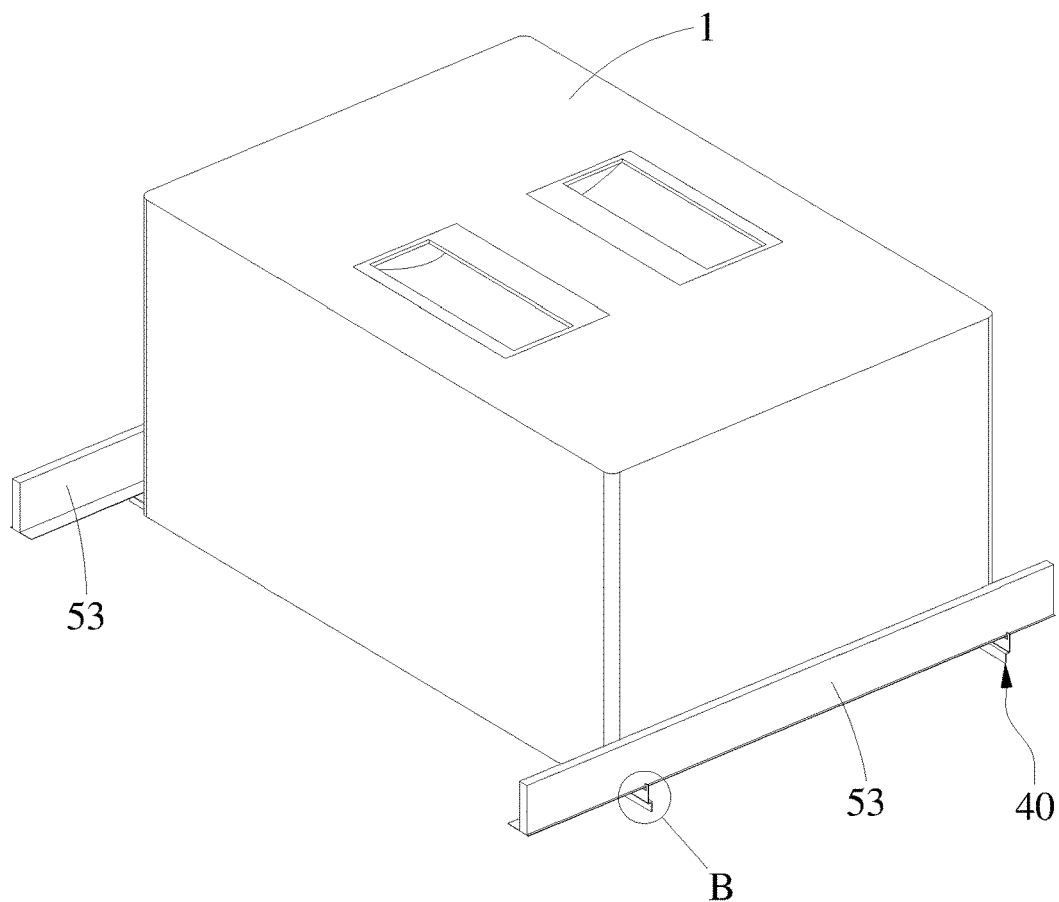
FIG. 14 is a structural diagram of the clamping arm, the fixing mechanism and the goods interacting according to another embodiment of the present disclosure.
Figure 15:
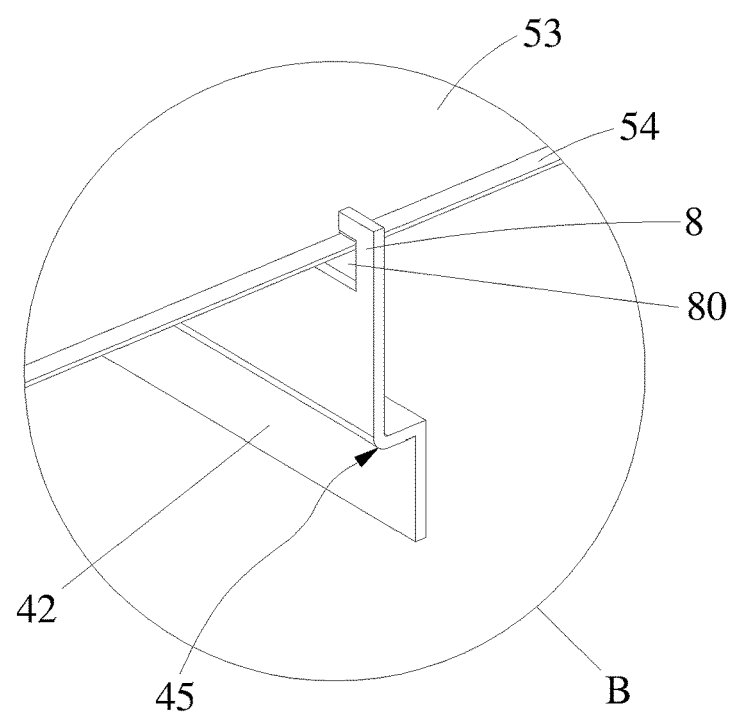
FIG. 15 is an enlarged view of a part B in FIG. 14.
Figure 16:
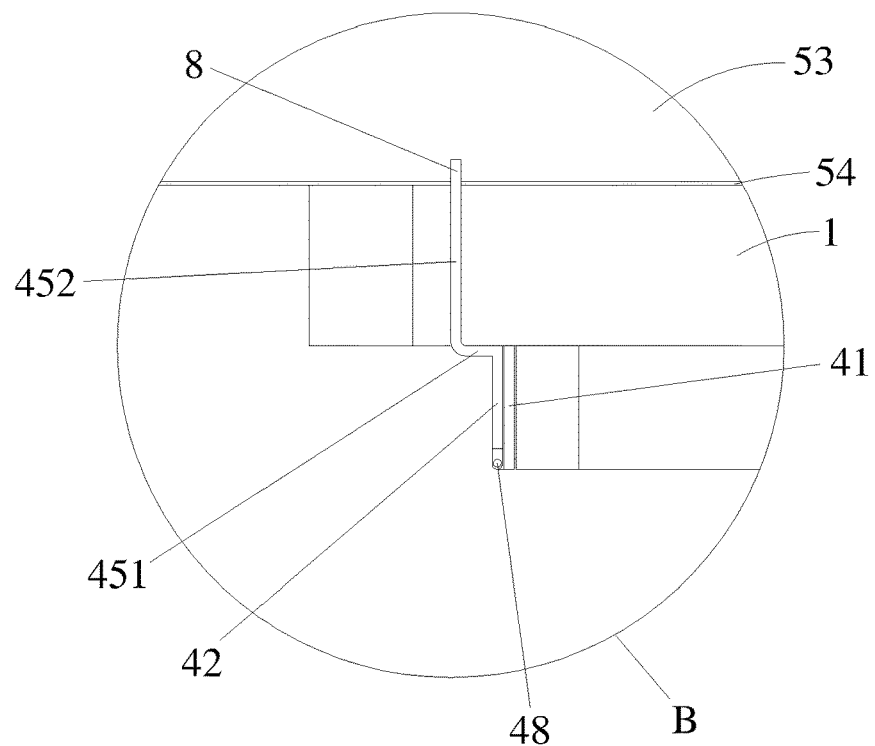
FIG. 16 is an enlarged side view of the part B in FIG. 14 when the clamping arm does not make the fixing mechanism release the goods.
Figure 17:
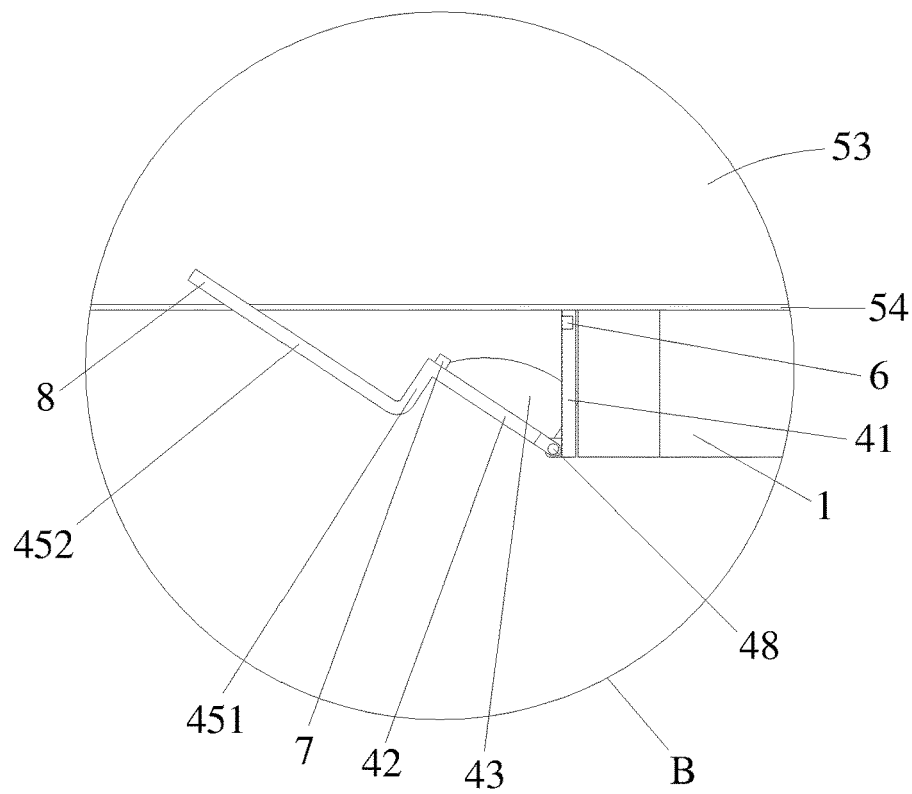

In one embodiment, please refer to FIG. 11 and FIG. 12. At least two opposite and spaced action assemblies 40 are arranged in each storage space 34, on each action assembly 40 the self-restoring member is arranged, the goods 1 are stored between the two action assemblies 40, and those two action assemblies 40 cooperate to fix the goods 1 relative to the storage space 34. In another embodiment, only one action assembly 40 is arranged in each storage space 34, the action assembly 40 is opposite to and is spaced apart from interior side of the wall of the vehicle body 2, the goods 1 are stored between the action assembly 40 and the interior side of the wall of the vehicle body 2, the action assembly 40 and the interior side of the wall of the vehicle body 2 cooperate to fix the goods 1 relative to the storage space 34. In other embodiments, the number of the action assembly 40 arranged in each storage space 34 may be adjusted as needed, which is not limited herein.

In one embodiment, please refer to FIGS. 5-9. The action assembly 40 comprises a fixed plate 41 arranged along a first direction and a movable plate 42 hinged with the fixed plate 41, the fixed plate 41 is fixedly mounted in the corresponding storage space 34. Specifically, the fixed plate 41 is fixedly mounted to the storage plate 341 of the storage space 34. The movable plate 42 is positioned at one side, which is away from the goods 1, of the fixed plate 41 (please refer to FIG. 8 and FIG. 9). A plurality of protrusions 43 (please refer to FIG. 8 and FIG. 12) are arranged on a side surface, which faces the goods 1, of the movable plate 42, each protrusion 43 is used to fix the goods 1 relative to the storage space 34. The fixed plate 41 is further used to limit position of the goods 1 in a second direction. The fixed plate 41 may be replaced with other structure, for example, the fixed plate 41 is replaced with a fixed bar arranged along the first direction. In this embodiment, the manufacturing cost of the action assembly 40 is low, it also helps to significantly lower the production cost and the maintenance cost of the goods-transport vehicle due to the large number of the storage spaces 34 required for the action assemblies 40 in the goods-transport vehicle.

It should be noted that, the second direction herein is parallel to the direction that the goods enter/exit the storage space 34 (as the Y axis direction in FIG. 4), the third direction is along the height direction of the goods 1 (as the Z axis direction in FIG. 4), and the first direction (as the X axis direction in FIG. 4) is perpendicular to the second direction and the third direction respectively.

Optionally, the fixed plate 41 and the movable plate 42 are hinged together by means of a hinge pin 48, the hinge pin 48 is arranged along the first direction on the movable plate 42. The self-restoring member is a resilient member 49 (please refer to FIG. 6). The resilient member 49 is sleeved on the hinge pin 48, and is connected with the fixed plate 41 and the movable plate 42 respectively. The resilient member 49 may be a torsion spring, etc. The type of the hinge pin 48 and the type of the resilient member 49 may be adjusted as needed, which is not limited herein.

Figure 7:
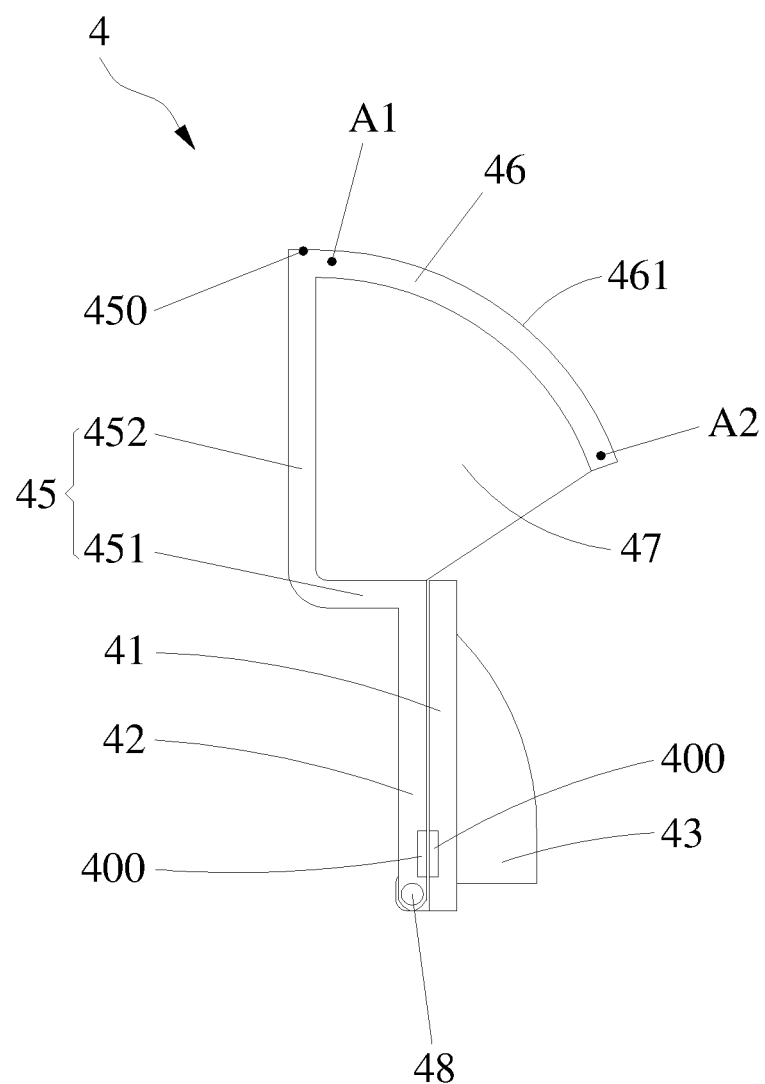
FIG. 7 is a side view of the fixing mechanism according to one embodiment of the present disclosure.

In another embodiment, referring to FIG. 7, the self-restoring member is a magnetic component, and the magnetic component includes a pair of magnetic units 400 magnetically attracted to each other, the pair of magnetic units are respectively arranged on the opposite sides of the fixed plate 41 and the movable plate 42, and are both close to the hinge pin 48. There is a strong magnetic attraction between the magnetic unit 400 of the movable plate 42 and the corresponding magnetic unit 400 of the fixed plate 41. When the action assembly 40 is not subjected to the acting force of the picking mechanism 5, the free end 421, opposite to hinge pin 48, of the movable plate 42 can move close to the fixed plate 41 under the action of the magnetic component, enabling each protrusion 43 to fix the goods 1 relative to the storage space 34. It is easily understood that if one of the fixed plate 41 and the movable plate 42 is made of metal that can be attracted to the magnetic unit 400, only the other one is required to be provided with the magnetic unit 400. In other embodiments, the type of self-restoring member may be adjusted as needed, which is not limited herein.

Figure 13:
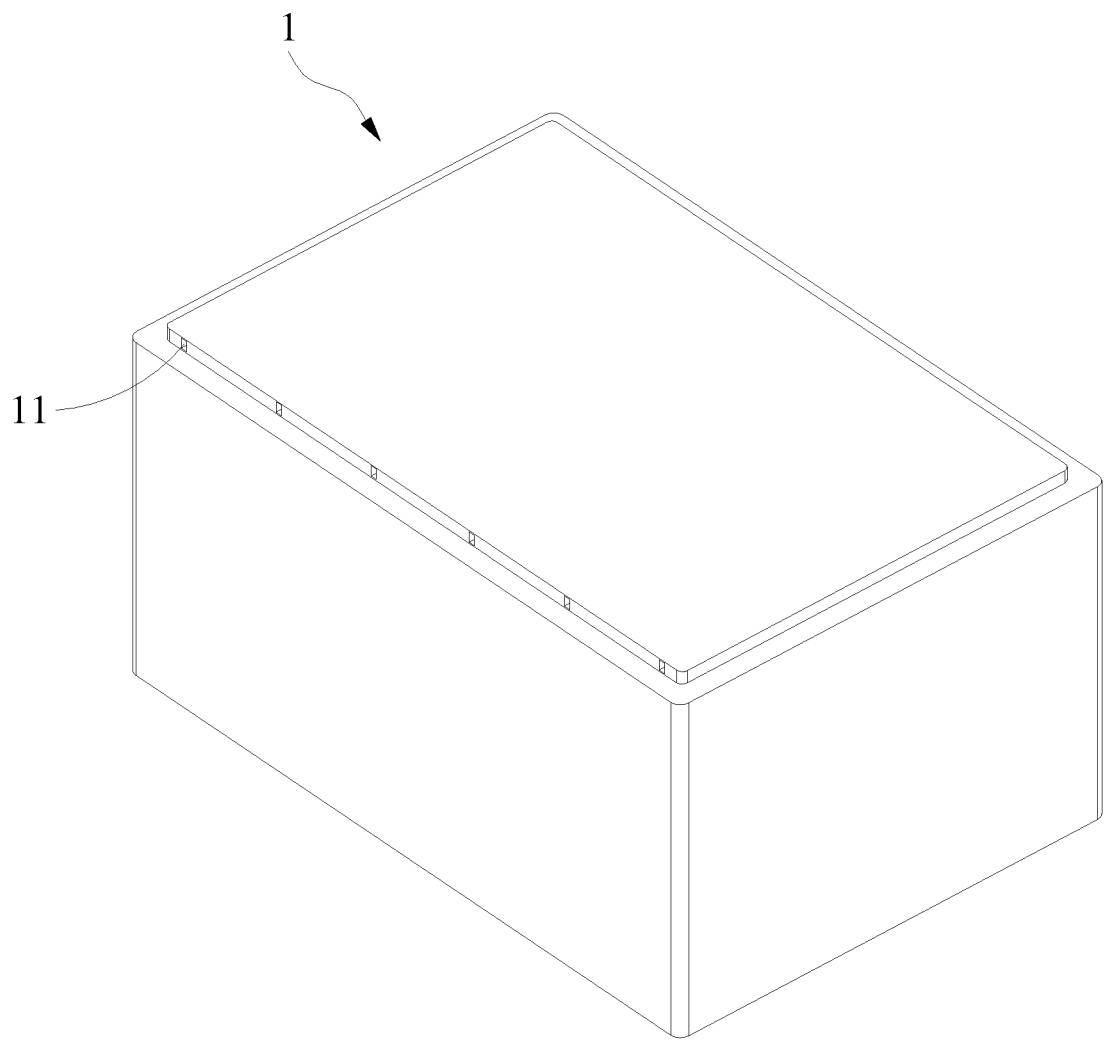

In one embodiment, referring to FIG. 13, the goods 1 may include a shipping box and an item in the shipping box. A hole 11 matched with the protrusion 43 is formed in a side surface, opposite to the fixed plate 41, of the shipping box. When the action assembly 40 is not subjected to the acting force of the picking mechanism 5, the free end 421 of the movable plate 42 moves close to the fixed plate 41 under the action of the self-restoring member, and each protrusion 43 can be inserted into the corresponding hole 11, so as to fix the goods 1 relative to the storage space 34. Optionally, the depth that the protrusion 43 is inserted into the hole 11 is small.

In another embodiment, when the action assembly 40 is not subjected to the acting force of the picking mechanism 5, the free end 421 of the movable plate 42 moves close to the fixed plate 41 under the action of the self-restoring member, and each protrusion 43 can abut against the side surface of the goods 1 and exert large pressure on the abutted side surface of the goods, so as to fix the goods 1 relative to the storage space 34 by means of friction between the protrusion 43 and the goods 1. The surface, which abuts against the goods 1, of each protrusion 43 is provided with an anti-slip coating, so as to increase the friction coefficient of the contact surface between the protrusion 43 and the goods 1.

Figure 6:
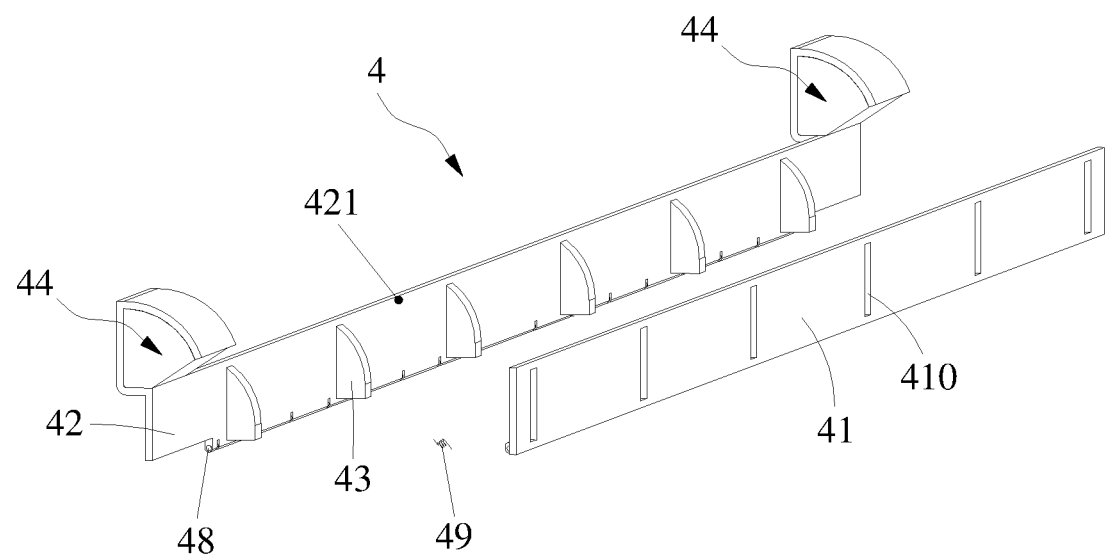
FIG. 6 is a schematic exploded view of the fixing mechanism according to one embodiment of the present disclosure.

In one embodiment, please refer to FIG. 6. Each fixed plate 41 is provided with a through hole 410 for the protrusion 43 of the corresponding movable plate 42 to pass through. When the free end 421 of the movable plate 42 is close to the fixed plate 41, each protrusion 43 passed through the corresponding through hole 410 to keep fixing the goods 1.

In another embodiment, the height of the movable plate 42 is larger than that of the fixed plate 41, and the mounting position of each protrusion 43 on the movable plate 42 is higher than the fixed plate 41, so that the through hole 410 is unnecessary. In other embodiments, the number and the mounting position of the protrusion 43 may be adjusted as needed, which is not limited herein.

In one embodiment, please refer to FIG. 5. The action assembly 40 further comprises action parts 44 respectively arranged at two ends of the movable plate 42, and the action parts 44 at two ends of the same movable plate 42 are aligned along the first direction. According to this structure, each action part 44 is used to be subjected to the acting force of the picking mechanism 5 so as to drive the movable plate 42 to rotate about the hinge pin 48 and to make the free end 421 of the movable plate 42 move away from the fixed plate 41, thus realizing that each protrusion 43 releases the goods 1. When each action part 44 is not subjected to the acting force of the picking mechanism 5, the self-restoring member is used to drive the movable plate 42 to rotate about the hinge pin 48 and to make the free end 421 of the movable plate 42 move close to the fixed plate 41, so as to realize that each protrusion 43 fixes the goods. It can be understood that when the acting force of the picking mechanism 5 to which each action part 44 is subjected decreases gradually, the self-restoring member can also drive the movable plate 42 to rotate about the hinge pin 48 and to make the free end 421 of the movable plate 42 move close to the fixed plate 41. The action assembly 40 may be not provided with the action parts 44, the two ends of the movable plate 42 are used to be subjected to the acting force of the picking mechanism 5 so as to drive the movable plate 42 to rotate about the hinge pin 48 and to make the free end 421 of the movable plate 42 move away from the fixed plate 41; when the two ends of the movable plate 42 are not subjected to the acting force of the picking mechanism 5, the self-restoring member is used to drive the movable plate 42 to rotate about the hinge pin 48 and to make the free end 421 of the movable plate 42 move close to the fixed plate 41.

Figure 8:
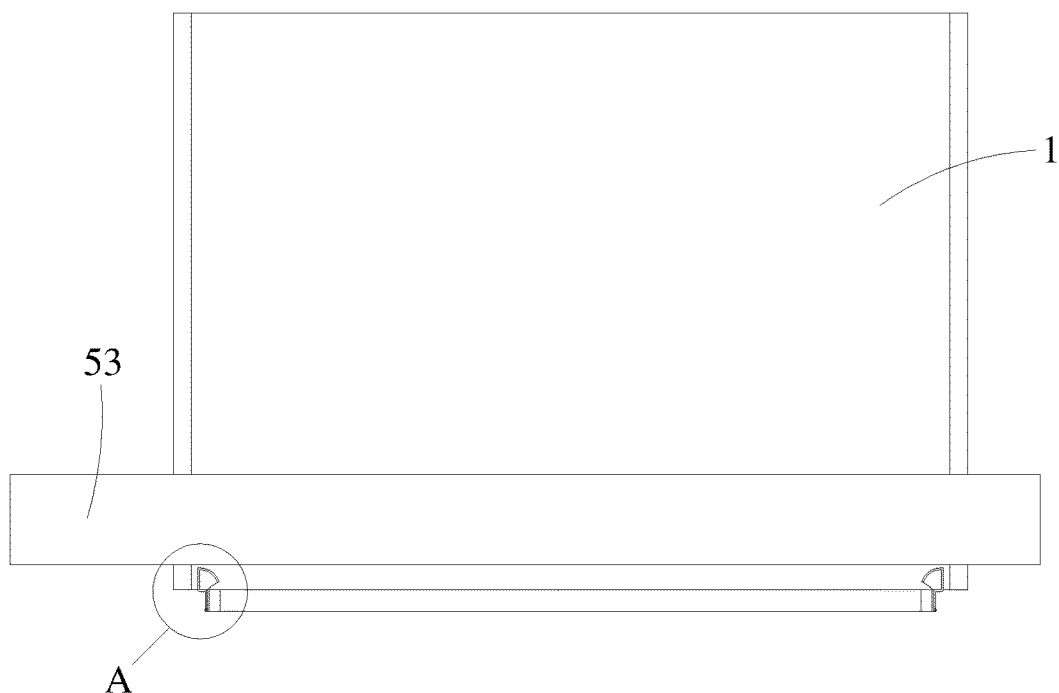
FIG. 8 is a side view of a clamping arm, the fixing mechanism and the goods interacting according to one embodiment of the present disclosure.
Figure 9:
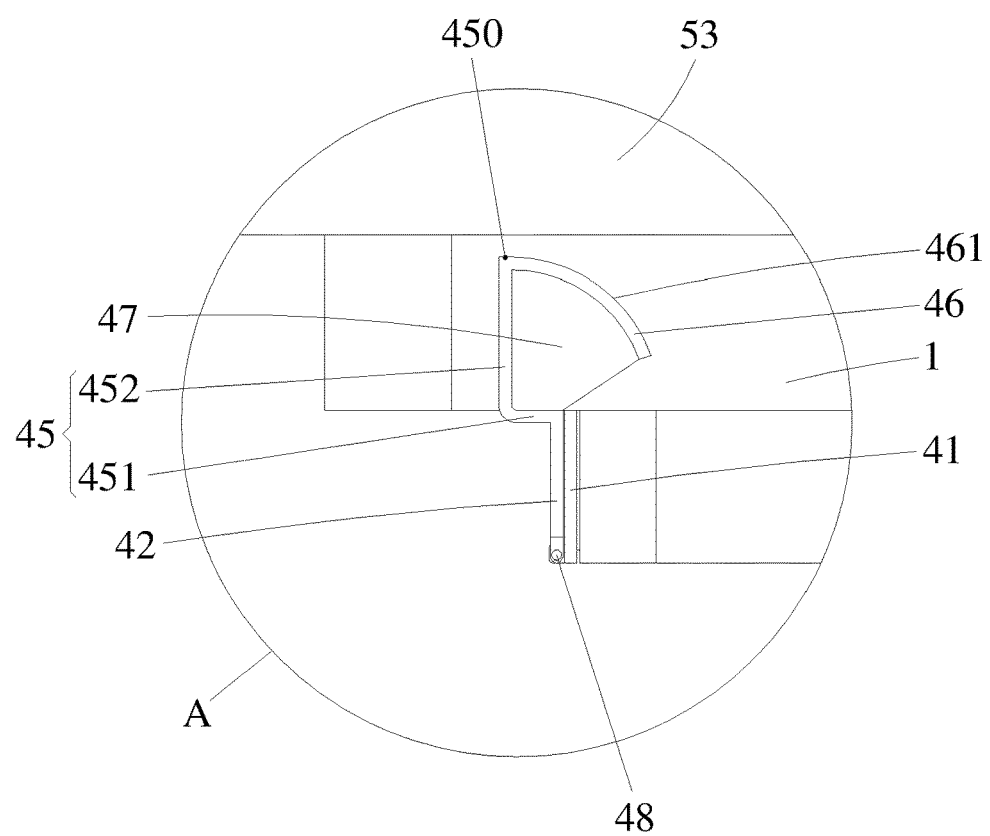
FIG. 9 is an enlarged view of a part A in FIG. 8 when the clamping arm does not make the fixing mechanism release the goods.

In one embodiment, please refer to FIG. 7. Each action part 44 comprises a support section 45 connected with the movable plate 42 and an extension section 46 connected with the support section 45. When the free end 421 of the movable plate 42 is close to the fixed plate 41 (as shown in FIG. 8 and FIG. 9), the top end 450 of each support section 45 is spaced a distance apart from the hinge pin 48 in the second direction, and is away from the fixed plate 41, the acting force of the picking mechanism 5 to which the top end 450 of each support section 45 is subjected is a depressing force downward in the third direction, so as to generate a moment of force about the hinge pin 48, the moment of force drives the movable plate 42 to rotate, the moment arm is equal to a distance from the acting force to the hinge pin 48. Optionally, the extension section 46 may be omitted, that is, each action part 44 only includes the support section 45.

In one embodiment, please refer to FIG. 7. The upper surface 461 of each extension section 46 extends from the top end 450 of the connected support section 45, a distance from each point of the upper surface 461 of each extension section 46 to the hinge pin 48 of the movable plate 42 decreases along the extension direction of the upper surface 461. Optionally, the distance between each point of the upper surface 461 of each extension section 46 and the hinge pin 48 of the movable plate 42 decreases along a direction from point A1 to point A2. In process of the free end 421 of the movable plate 42 moving away from the fixed plate 41, the contact position of each action part 44 and the picking mechanism 5 shifts away from the top end 450 of the connected support section 45 along the upper surface 461 of each extension section 46, that is, the contact position approaches the point A2 from the point A1. Compared to the situation that the action part 44 is not equipped with the extension section 46, the picking mechanism 5 can achieve the designated angle of rotation of the movable plate 42 about the hinge pin 48 by pressing down at a smaller distance after contacting top end of the action part 44. In other embodiments, the shape, the structure and the size of each extension section 46 may be adjusted as needed, which is not limited herein.

In one embodiment, please refer to FIG. 8, FIG. 9 and FIG. 11. When the action assembly 40 fixes the goods 1 relative to the storage space 34, a projection of the extension section 46 on a plane in the first direction intersects with a projection of the goods 1 on the same plane in the first direction, and the projection plane is perpendicular to the first direction, so that the extension sections 46 at two ends of the same movable plate 42 are positioned at both sides of the goods 1 respectively, and are capable of limit position of the goods 1 in the first direction. It can be understood that the minimum distance between the extension sections 46 at two ends of the same movable plate 42 is slightly larger than the length of the goods 1 in the first direction. When the goods-transport vehicle rapidly speeds up or comes to a screeching halt or goes up/down a steep slope, the goods 1 have large tendency to move relative to the storage space 34 in the speed direction of the goods-transport vehicle (that is the first direction in this embodiment), alternatively, when the goods-transport vehicle makes a sharp turn with a small radius, the goods 1 have large tendency to move relative to the storage space 34 in the normal acceleration direction of the goods-transport vehicle (that is the second direction in this embodiment). The position of the goods 1 is limited in the first direction by means of the extension sections 46, and is limited in the second direction by means of the fixed plate 41, so as to further ensure that the goods 1 can be fixed relative to the storage space 34 on various running conditions of the transport vehicle.

In one embodiment, please refer to FIG. 7. The action part 44 and the movable plate 42 are a structure formed by sheet metal processing. Optionally, each support section 45 includes a first segment 451 connected with the movable plate 42 and a second segment 452 connected with the first segment 451. The first segment 451 is positioned at one side, away from the fixed plate 41, of the movable plate 42, and is arranged along the second direction, the second segment 452 is arranged along the third direction, the extension section 46 is connected with the second segment 452. Each support section 45 and the connected extension section 46 enclose a cavity 47, a filling material is arranged in each cavity 47. The filling material can enhance the structural rigidity of the action part 44. Optionally, the filling material may be a lightweight foam material. In other embodiments, each action part 44 may be other type of structure, which is not limited herein, for example, each action part 44 may be a solid structure formed by plastic injection molding.

Figure 10:
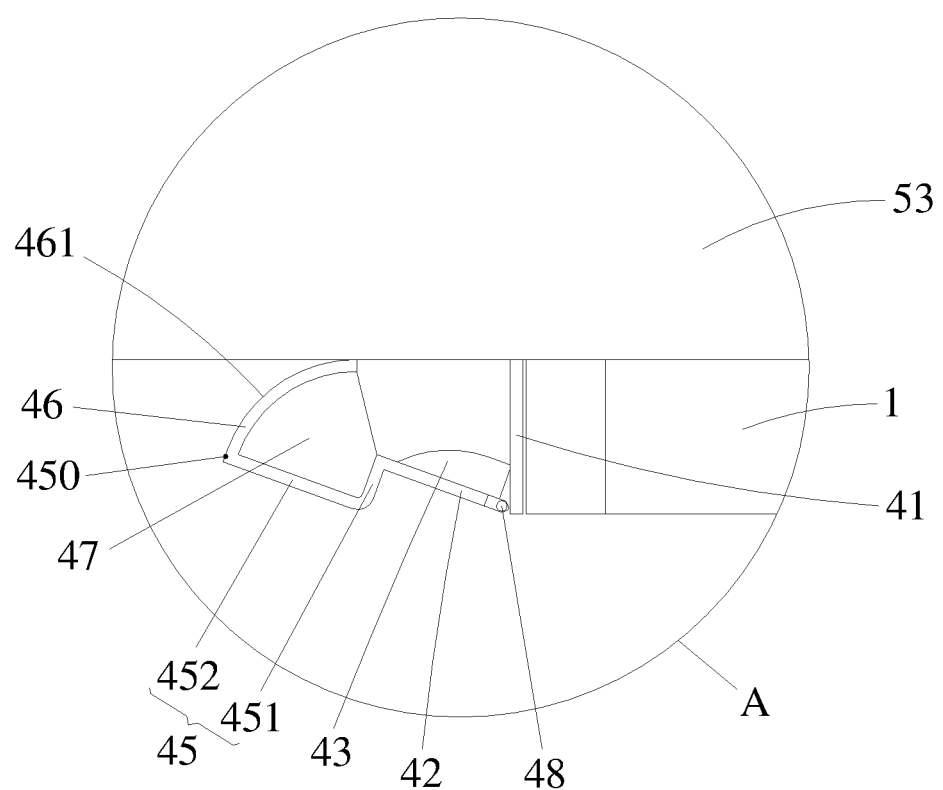
FIG. 10 is an enlarged view of the part A in FIG. 8 when the clamping arm makes the fixing mechanism release the goods.

In one embodiment, please refer to FIGS. 8-10. The picking mechanism 5 comprises at least two clamping arms 53 used for clamping the goods 1, and the clamping arms 53 are further used to depress the action assembly 40 to make the action assembly 40 release the goods 1 in process of the picking mechanism 5 taking the goods 1 from the corresponding storage space 34. Specifically, the clamping arms 53 depress each action part 44 to make each protrusion 43 release the goods 1. Wherein, the bottom surface of the clamping arm 53 may be planar, and the upper surface of the extension section 46 may be arc shaped: when the clamping arm 53 depresses the action part 44, the contact area between the bottom surface of the clamping arm 53 and the upper surface of the extension section 46 is small, so that, at this time, the friction to which the clamping arm 53 is subjected is small in process of the clamping arm 53 sliding relative to the action part 44 in the first direction. In addition, the upper surface of each extension section 46, in another word, the action part 44, is equipped with a first lubricating coating, additionally/alternatively, the bottom surface of each clamping arm 53 is equipped with a second lubricating coating, so as to lower the friction between each clamping arm 53 and the corresponding action part 44. Alternatively, the clamping arm 53 and the action part 44 are each equipped with a magnetic unit, a strong magnetic repulsion can be generated between the magnetic unit of the clamping arm 53 and the magnetic unit of the action part 44, so that the force which the clamping arm 53 acts on the action part 44 becomes the magnetic repulsion that can be generated without contact of the action part 44 and the clamping arm 53, thereby eliminating the friction between the clamping arm 53 and the action part 44.

Optionally, referring to FIG. 4, the picking mechanism 5 comprises a sliding frame 52 and two oppositely-arranged clamping arms 53. The sliding frame 52 is arranged in a supporting structure 51 and is capable of sliding in the supporting structure 51. At least one of the two clamping arms 53 is capable of sliding relative to the other one, so that a distance between the two clamping arms 53 is adjustable, enabling the two clamping arms 53 to clamp the goods 1 and to release the goods 1. The two clamping arms 53 are each provided with a supporting portion, the supporting portions of the two clamping arms are respectively arranged on the sides, close to each other, of the two clamping arms 53, the goods 1 are provided with corresponding portions used for being supported. Those corresponding portions are respectively arranged on both sides of the goods 1, and are higher than the bottom surface of the goods 1. The supporting portions of the two clamping arms 53 can jointly support the goods by supporting the corresponding portions of the goods 1 in process of the clamping arms 53 clamping the goods 1. The two clamping arms 53 are also extendable in the second direction, enabling the two clamping arms 53 to move the goods 1 in the second direction.

In one embodiment, the fixing mechanism 4 is detachably mounted in the storage space 34. Specifically, the fixed plate 41 can be fixed to the storage plate 341 of each storage space 34 by a detachable mean such as a screw, a snap-fit, etc. Further, the goods 1 have various sizes. Optionally, the goods 1 comprise the shipping boxes and the items in the shipping boxes, and the shipping boxes have various sizes. Correspondingly, the fixing mechanisms 4 in various types are provided so as to fix the goods 1 in various sizes. For example, the different types of the fixing mechanisms 4 differ in the length of the fixed plates 41 in the first direction, and also differ in the distance between the two action assemblies 40 which cooperate to fix the same goods 4, so that the different types of the fixing mechanisms 4 are respectively used for fixing the goods 1 in different length and different width. The storage space 34 may be equipped with any of the various types of the fixing mechanisms. Optionally, the storage plate 341 of the storage space 34 is provided with mounting holes matched with the various types of the fixing mechanisms. In part or all of the storage spaces 34 of the goods-transport vehicle, the various types of the fixing mechanisms can be mounted and replaced as needed, enabling the goods-transport vehicle to flexibly configure the storage capacity for the goods 1 in various sizes, for example, after the fixing mechanisms 4 used for fixing large-size goods are replaced with the fixing mechanisms 4 used for fixing small-size goods 1, more fixing mechanisms 4 can be arranged in the same storage space 34, enabling the storage space 34 to store more small-size goods 1.

It should be noted that the fixed plate 41 may be integrated with the storage plate 341 of the storage space 34, the action assembly 40 does not include the fixed plate 41, that is, the movable plate 42 can be directly or indirectly mounted in the corresponding storage space 34 and can rotate relative to the storage space 34. Specifically, the movable plate 42 can be directly or indirectly mounted to the storage plate 341 of the storage space 34 and can rotate relative to the storage plate 341, a rotation axis of the movable plate 42 is arranged along the first direction. Other parts of the action assembly 40 are described in the above-mentioned embodiments, that is, the action assembly 40 further comprises the action part 44 arranged on the movable plate 42, the action part 44 comprises the support section 45 connected with the movable plate 42 and the extension section 46 connected with the support section 45; when each protrusion 43 of the movable plate 42 fixes the goods relative to the storage space 34, the top end of the support section 45 is spaced a distance apart from the rotation axis of the movable plate 42 in the second direction, so that the acting force of the picking mechanism 5 to which the top end 450 of the support section 45 is subjected can generate a moment of force about the rotation axis, the moment of force drives the movable plate 42 to rotate, a distance from each point of the upper surface of the extension section 46 to the rotation axis of the movable plate 42 decreases along the extension direction of the upper surface.

In another embodiment, the self-restoring member may be omitted, and the action assembly 40 is further used to be driven by the acting force of the picking mechanism 5 so as to fix the goods 1 in process of the picking mechanism 5 placing the goods 1 in the corresponding storage space 34. That is, the action assembly 40 is used to be driven by the acting force of the picking mechanism 5 to release the goods 1 in process of the picking mechanism 5 taking the goods 1 from the corresponding storage space 34, and is used to be driven by the acting force of the picking mechanism 5 to fix the goods 1 in process of the picking mechanism 5 placing the goods 1 in the corresponding storage space 34.

Please refer to FIGS. 14-17. Specifically, the fixing mechanism 4 comprises at least one action assembly 40 arranged in each storage space 34. The action assembly 40 comprises a fixed plate 41 arranged along the first direction and a movable plate 42 hinged with the fixed plate 41. The plurality of protrusions 43 are arranged on the side, which faces the goods, of the movable plate 42, the movable plate 42 is provided with a snap-fit joint 7, and the fixed plate 41 is provided with a snap-fit groove 6 matched with the snap-fit joint 7. The action assembly 40 further comprises a support section 45 connected with the movable plate 42, the support section 45 is used to be subjected to the acting force of the picking mechanism 5 so as to drive the snap-fit joint 7 of the movable plate 42 to separate from and to move far away from the snap-fit groove 6 of the fixed plate 41 (referring to FIG. 17), thus realizing that each protrusion 43 releases the goods 1. Besides, the action assembly 40 further comprises a lift part 8 arranged on the top end of the support section 45, the lift part 8 is used to be subjected to the acting force of the picking mechanism 5 so as to drive the snap-fit joint 7 of the movable plate 42 to approach and to engaged with the snap-fit groove 6 of the fixed plate 41. Specifically, the length of the lift part 8 in the first direction is less than the length of the support section 45 in the first direction, and the lift part 8 is arranged away from the goods 1. A groove 80 facing the goods 1 is formed between a portion of the surface of the lift part 8 and the top end of the support section 45 (referring to FIG. 14 and FIG. 15).

Correspondingly, the picking mechanism 5 comprises at least two clamping arms 53 used for clamping the goods 1. Each clamping arm 53 is provided with a flange 54, the flange is arranged along the second direction on the side, facing the corresponding groove 80, of the clamping arm 53, the bottom surface of each flange 54 is coplanar with the bottom surface of the clamping arm 53. Specifically, in process of the picking mechanism 5 placing the goods 1 onto the storage plate 341 of the storage space 34, the two clamping arms 53 move away from each other to release the goods 1, and each flange 54 can partially move into the corresponding groove 80; after that, the clamping arms 53 move up in the third direction, and each flange 54 can act a lifting force on the lift part 8 to drive the snap-fit joint 7 of the movable plate 42 to approach and to engage with the snap-fit groove 6 of the fixed plate 41 (referring to FIG. 14 and FIG. 15), so that each protrusion 43 fixes the goods 1.

The other parts in this embodiment are identical to those in the above-mentioned embodiment, the details are not described herein again. When the snap-fit joint 7 of the movable plate 42 is engaged with the snap-fit groove 6 of the fixed plate 41, the top end of the support section 45 is spaced a distance apart from the hinge pin 48 of the movable plate 42 in the second direction, and is arranged away from the fixed plate 41, so that the acting force of the picking mechanism 5 to which the top end of the support section 45 is subjected can generate a moment of force about the hinge pin 48, the moment of force drives the movable plate 42 to rotate.

In this embodiment, as the fixing mechanism 4 can automatically release and automatically fix the goods 1 by means of the acting force of the picking mechanism 5, so that the actuator is also not required to be additionally arranged in each storage space 34.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for persons skilled in the art, several modifications and improvements can be made without departing from the conception of the present disclosure, which shall all fall within the scope of the present disclosure. Therefore, the scope of the present disclosure shall be subject to the appended claims.

The invention claimed is:

1. A goods-transport vehicle comprising:
a vehicle body and a goods rack arranged in the vehicle body, wherein the goods rack is provided with a plurality of storage spaces used for storing goods;
a picking mechanism arranged in the vehicle body, wherein the picking mechanism is used to automatically place the goods in each storage space and to automatically take the goods from each storage space;
a fixing mechanism arranged in each storage space, wherein, after the goods are placed in the corresponding storage space by the picking mechanism, the fixing mechanism is used to automatically fix the goods relative to the storage space; and
wherein the fixing mechanism comprises at least one action assembly arranged in each storage space, the action assembly is used to be driven by an acting force of the picking mechanism so as to release the goods in process of the picking mechanism taking the goods from the corresponding storage space; and
wherein the action assembly comprises a movable plate, the movable plate is mounted in the corresponding storage space and is capable of rotating relative to the storage space, a plurality of protrusions are arranged on a side surface, which faces the goods, of the movable plate, each protrusion is used to fix the goods relative to the storage space.

2. The goods-transport vehicle of claim 1, wherein the fixing mechanism further comprises a self-restoring member arranged on the action assembly, the self-restoring member is used to drive the action assembly to fix the goods.

3. The goods-transport vehicle of claim 2, wherein the action assembly further comprises a fixed plate or a fixed bar arranged along a first direction, the movable plate is hinged with the fixed plate or the fixed bar, the fixed plate or the fixed bar is fixedly mounted in the corresponding storage space, the movable plate is positioned at one side, which is away from the goods, of the fixed plate or the fixed bar.

4. The goods-transport vehicle of claim 3, wherein the self-restoring member is a resilient member, and is connected with the fixed plate and the movable plate respectively; alternatively, the self-restoring member includes a pair of magnetic units magnetically attracted to each other, the pair of magnetic units are respectively arranged on the opposite sides of the fixed plate and the movable plate, and are both close to a hinge pin of the movable plate and the fixed plate; alternatively, the self-restoring member is a magnetic unit, one of the fixed plate and the movable plate is made of metal that can be attracted by the magnetic unit, the other one is provided with the magnetic unit; and/or each fixed plate or each fixed bar is provided with a through hole for the protrusions of the corresponding movable plate to pass through, when free end of the movable plate is close to the fixed plate or the fixed bar, each protrusion passed through the corresponding through hole to keep fixing the goods; alternatively, the height of the movable plate is larger than that of the fixed plate or the fixed bar, and the mounting position of each protrusion on the movable plate is higher than the fixed plate or the fixed bar.

5. The goods-transport vehicle of claim 3, wherein the action assembly further comprises action parts respectively arranged at two ends of the movable plate, and the action parts at two ends of the same movable plate are aligned along the first direction, each action part is used to be subjected to the acting force of the picking mechanism so as to drive the movable plate to rotate about a hinge pin of the movable plate and the fixed plate or a hinge pin of the movable plate and the fixed bar, and to make the free end of the movable plate move away from the fixed plate or the fixed bar, thus realizing that each protrusion releases the goods; when each action part is not subjected to the acting force of the picking mechanism, or the acting force of the picking mechanism to which each action part is subjected decreases gradually, the self-restoring member is used to drive the movable plate to rotate about the hinge pin and to make the free end of the movable plate move close to the fixed plate or the fixed bar, so as to realize that each protrusion fixes the goods.

6. The goods-transport vehicle of claim 5, wherein each action part comprises a support section connected with the movable plate; when the free end of the movable plate is close to the fixed plate or the fixed bar, the top end of each support section is spaced a distance apart from the hinge pin in a second direction, so that the acting force of the picking mechanism to which the top end of each support section is subjected is capable of generating a moment of force about the hinge pin, the moment of force drives the movable plate to rotate; the first direction is perpendicular to the second direction.

7. The goods-transport vehicle of claim 6, wherein each action part further comprises an extension section connected with the support section, the upper surface of each extension section extends from the top end of the connected support section, a distance from each point of the upper surface of the extension section to the hinge pin of the movable plate decreases along the extension direction of the upper surface, so that, in process of the free end of the movable plate moving away from the fixed plate or the fixed bar, the contact position of each action part and the picking mechanism shifts away from the top end of the connected support section along the upper surface of each extension section.

8. The goods-transport vehicle of claim 7, wherein when the free end of the movable plate is close to the fixed plate or the fixed bar, a projection of the extension section on a plane in the first direction intersects with a projection of the goods on the same plane in the first direction, enabling the extension sections at two ends of the same movable plate to limit position of the goods in the first direction; the projection plane is perpendicular to the first direction; and the fixed plate or the fixed bar is further used to limit position of the goods in the second direction.

9. The goods-transport vehicle of claim 1, wherein a rotation axis of the movable plate is arranged along a first direction the action assembly further comprises an action part arranged on the movable plate, the action part is used to be subjected to the acting force of the picking mechanism so as to drive the movable plate to rotate about the rotation axis, thus making each protrusion release the goods; alternatively, two ends of the movable plate are used to be subjected to the acting force of the picking mechanism so as to drive the movable plate to rotate about the rotation axis and to make each protrusion release the goods.

10. The goods-transport vehicle of claim 9, wherein action part comprises a support section connected with the movable plate; when each protrusion of the movable plate fixes the goods relative to the storage space, the top end of the support section is spaced a distance apart from the rotation axis in a second direction, so that the acting force of the picking mechanism to which the top end of the support section is subjected is capable of generating a moment of force about the rotation axis, the moment of force drives the movable plate to rotate; the first direction is perpendicular to the second direction.

11. The goods-transport vehicle of claim 10, wherein the action part further comprises an extension section connected with the support section, the upper surface of each extension section extends from the top end of the connected support section, a distance from each point of the upper surface of the extension section to the rotation axis of the movable plate decreases along the extension direction of the upper surface; and/or the acting force of the picking mechanism to which the top end of each support section is subjected is a depressing force downward in the third direction, the first direction is perpendicular to the second direction and the third direction respectively.

12. The goods-transport vehicle of claim 11, wherein the upper surface of the extension section is arc shaped; and/or the third direction is along the height direction of the goods.

13. The goods-transport vehicle of claim 1, wherein the goods may include a shipping box and an item in the shipping box, a hole matched with the protrusion is formed in a side surface of the shipping box, each protrusion is capable of being inserted into the corresponding hole, so as to fix the goods relative to the storage space; or each protrusion is capable of abutting against a side surface of the goods and exerting pressure on the abutted side surface of the goods, so as to fix the goods relative to the storage space by means of friction between the protrusion and the goods.

14. A goods-transport vehicle comprising:

a vehicle body and a goods rack arranged in the vehicle body, wherein the goods rack is provided with a plurality of storage spaces used for storing goods;

a picking mechanism arranged in the vehicle body, wherein the picking mechanism is used to automatically place the goods in each storage space and to automatically take the goods from each storage space;

a fixing mechanism arranged in each storage space, wherein, after the goods are placed in the corresponding storage space by the picking mechanism, the fixing mechanism is used to automatically fix the goods relative to the storage space, making the goods avoid shaking relative to the storage space when the goods-transport vehicle is running; and wherein the fixing mechanism comprises at least one action assembly arranged in each storage space, the action assembly is used to be driven by an acting force of the picking mechanism so as to release the goods in process of the picking mechanism taking the goods from the corresponding storage space; and wherein the action assembly is further used to be driven by the acting force of the picking mechanism so as to fix the goods in process of the picking mechanism placing the goods in the corresponding storage space.

15. The goods-transport vehicle of claim 14, wherein the action assembly comprises a fixed plate or a fixed bar arranged along a first direction and a movable plate hinged with the fixed plate or the fixed bar, the fixed plate or the fixed bar is fixedly mounted in the corresponding storage space, the movable plate is positioned at one side, which is away from the goods, of the fixed plate or the fixed bar, a plurality of protrusions are arranged on a side surface, which faces the goods, of the movable plate, each protrusion is used to fix the goods relative to the storage space, the movable plate is provided with a snap-fit joint, and the fixed plate or the fixed bar is provided with a snap-fit groove matched with the snap-fit joint; and the action assembly further comprises a support section connected with the movable plate and a lift part connected with the support section; the support section is used to be subjected to the acting force of the picking mechanism so as to drive the snap-fit joint of the movable plate to separate from and to move far away from the snap-fit groove of the fixed plate or the fixed bar, thus realizing that each protrusion releases the goods; the lift part is used to be subjected to the acting force of the picking mechanism so as to drive the snap-fit joint of the movable plate to approach and to engaged with the snap-fit groove of the fixed plate or the fixed bar, thus realizing that each protrusion fixes the goods.

16. The goods-transport vehicle of claim 15, wherein the lift part is arranged on the top end of the support section, and is arranged away from the goods, a groove facing the goods is formed between a portion of the surface of the lift part and the top end of the support section; and the picking mechanism comprises at least two clamping arms used for clamping the goods, each clamping arm is provided with a flange arranged along a second direction; in process of the picking mechanism placing the goods in the storage space, the two clamping arms move away from each other to release the goods, and each flange can partially move into the corresponding groove, then the clamping arms move up in a third direction, so that each flange can act a lifting force on the lift part to drive the snap-fit joint of the movable plate to approach and to engage with the snap-fit groove of the fixed plate or the fixed bar; the first direction is perpendicular to the second direction and the third direction respectively.

17. The goods-transport vehicle of claim 15, wherein when the snap-fit joint of the movable plate is engaged with the snap-fit groove of the fixed plate, the top end of the support section is spaced a distance apart from a hinge pin of the movable plate and the fixed plate or a hinge pin of the movable plate and the fixed bar in a second direction, so that the acting force of the picking mechanism to which the top end of the support section is subjected can generate a moment of force about the hinge pin, the moment of force drives the movable plate to rotate; the second direction is perpendicular to the first direction.

18. A goods-transport vehicle comprising:
   a vehicle body and a goods rack arranged in the vehicle body, wherein the goods rack is provided with a plurality of storage spaces used for storing goods;
   a picking mechanism arranged in the vehicle body, wherein the picking mechanism is used to automatically place the goods in each storage space and to automatically take the goods from each storage space;
   a fixing mechanism arranged in each storage space, wherein, after the goods are placed in the corresponding storage space by the picking mechanism, the fixing mechanism is used to automatically fix the goods relative to the storage space, making the goods avoid shaking relative to the storage space when the goods-transport vehicle is running; and
   wherein the fixing mechanism comprises at least one action assembly arranged in each storage space, the action assembly is used to be driven by an acting force of the picking mechanism so as to release the goods in process of the picking mechanism taking the goods from the corresponding storage space; and
   wherein at least two opposite and spaced action assemblies are arranged in each storage space, the goods are stored between the two action assemblies, and those two action assemblies cooperate to fix the goods relative to the storage space.

19. The goods-transport vehicle of claim 18, wherein the picking mechanism comprises at least two clamping arms used for clamping the goods, and the clamping arms are further used to depress the action assembly to make the action assembly release the goods in process of the picking mechanism taking the goods from the corresponding storage space.

20. The goods-transport vehicle of claim 18, wherein the fixing mechanisms in various types are provided so as to fix the goods in various sizes relative to the storage space; and
   the fixing mechanism is detachably mounted in the storage space; in part or all of the storage spaces of the goods-transport vehicle, the various types of the fixing mechanisms are capable of being mounted and being replaced, enabling the goods-transport vehicle to flexibly configure storage capacity for the goods in various sizes.

* * * * *